Figure 1:
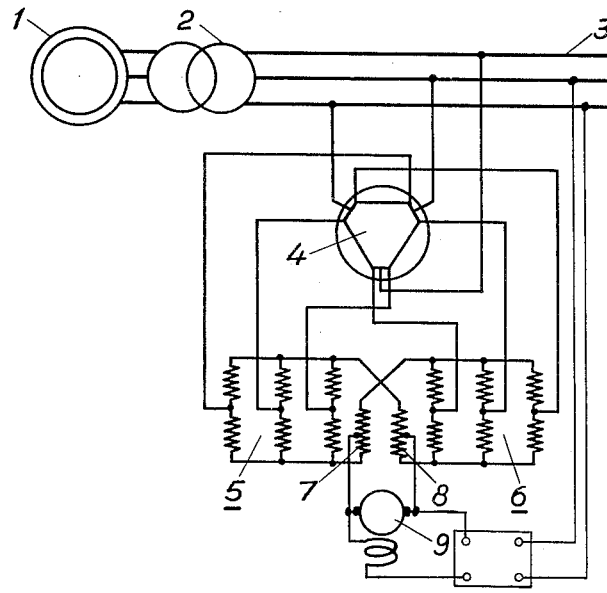

Dec. 8, 1953 H. FORSSELL 2,662,210
PHASE COMPENSATING MEANS FOR ALTERNATING CURRENT LINES
Filed Aug. 9, 1949 2 Sheets-Sheet 1

INVENTOR
HARRY FORSSELL
By James Aiken
ATTORNEY

Dec. 8, 1953 H. FORSSELL 2,662,210
PHASE COMPENSATING MEANS FOR ALTERNATING CURRENT LINES
Filed Aug. 9, 1949 2 Sheets-Sheet 2

INVENTOR
HARRY FORSSELL
By James Aiken
ATTORNEY

Patented Dec. 8, 1953

2,662,210

UNITED STATES PATENT OFFICE 2,662,210

PHASE COMPENSATING MEANS FOR
ALTERNATING CURRENT LINES

Harry Forssell, Ludvika, Sweden, assignor to Allmänna Svenska Elektriska Aktiebolaget, Vasteras, Sweden, a Swedish corporation Application August 9, 1949, Serial No. 109,291

Claims priority, application Sweden
August 9, 1948

5 Claims. (Cl. 323—107)

A method of obtaining dynamic stability in alternating current power transmission systems, especially in such systems operating with long distance lines, is to connect reactors capable of regulation in parallel to the lines. In order to make the regulation of such reactors continuous, which is important for avoiding discontinuities in the voltage or current, it has also been proposed to effect the regulation by means of direct current saturation. As hitherto usually constructed, direct current saturable reactors are however not suitable for this purpose, because a comparatively large inductance is necessary in their direct current circuit for suppressing alternating current waves therein, such waves being of frequencies corresponding to the second and higher harmonics of the alternating current. A high inductance in the direct current circuit retards any regulating action by retarding variations in the saturating direct current. Also the property of automatically keeping alternating current voltage constant during short periods of abnormal conditions, which is inherent in any direct current saturable reactor on account of the magnetic energy stored in its direct current circuit, is adversely affected by a high external inductance in the said circuit, the said external inductance absorbing the major portion of the magnetic energy and leaving only a small fraction to the saturable reactor.

According to the present invention, such steps are taken that the inductance in the direct current saturating circuit is kept reasonably low while at the same time the losses caused by the superposed alternating current waves in the said circuit are also kept at a moderate value. Preferably, there should be no other inductance in the direct current circuit than that inherent in the magnetizing windings of the reactor and in the direct current source, but a small external inductance may also be permissible. On the other hand, such a small total inductance may cause too heavy pulsations in the direct current, if not special precautions are provided for avoiding this. A mathematical investigation of the factors involved shows that the total reactance of the saturating direct current circuit at the frequency of the alternating current should be less than one third of that corresponding to the full load reactive power of the saturable reactor divided by the square of the corresponding direct current. At the same time, the pulsations of the lowest frequency appearing in any independent reactor forming part of the saturable reactor should be essentially lower than that corresponding to the aforesaid total reactance, and special steps must be taken for this purpose. The combination of such steps with the aforesaid rule of dimensioning the reactance of the direct current circuit forms the object of the present invention.

Five different forms of the invention are diagrammatically illustrated in Figs. 1-5 of the accompanying drawing.

Referring to Fig. 1, the numeral 1 designates a generator feeding a transmission line 3 across a transformer 2. In parallel to the line, the phase compensating reactor is connected through another transformer 4. This connection is shown as made on the secondary side of the transformer 2, but may as well be on the primary side of the said transformer. The connection on the secondary side is, however, generally preferable for stabilizing purposes. The transformer 4 is of the type suitable for tapping secondary voltages of different phases therefrom, in the example shown two three-phase systems differing in phase by 30°, one leading the line voltage by 15° and the other lagging 15° after the line voltage. Each of these secondary voltages is impressed on an independent six-phase reactor 5, 6 of the type described in the U. S. patent specification No. 2,372,112. The direct current circuits of the said reactors are connected together across interphase transformers 7, 8 and fed from a common direct current source shown as a generator 9. The regulation may be effected in the exciting circuit of said generator. As the two reactors have together twelve independent flux paths, the lowest frequency of the pulsations induced in the direct current circuit from the alternating current side will be twelve times that of the alternating current, thus twice the frequency caused by each independent reactor 5 or 6, and therefore even a moderate inductance of the circuit will act as a high impedance for these pulsations and reduce them to a permissible value.

Figure 2:
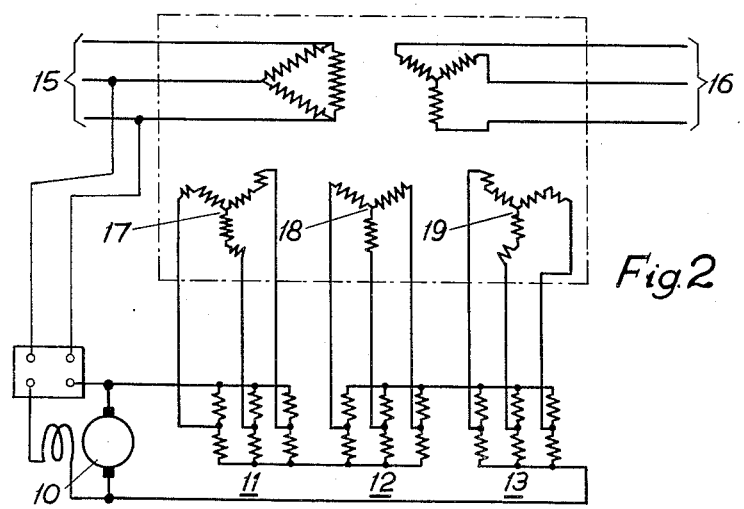

In the form illustrated in Fig. 2, an incoming line, connected to a primary transformer winding in delta connection, is designated by 15, and an outgoing line, connected to a Y-connected secondary winding of the same transformer, is designated by 16. The transformer has three more windings, two of which 17, 19 are zigzag connected and the third one 18 Y-connected. This will give three different three-phase voltages mutually differing in phase by 20°, and each of these voltages is impressed on an independent sixphase reactor 11, 12, 13 respectively of the same type as the reactors 5 and 6 in Fig. 1. The direct current paths of the three reactors are here connected in series to the current source 10, said connection being possible by the feeding of the alternating currents from three independent transformer windings. The lowest frequency of the pulsations in the direct current circuit thus obtained will be eighteen times that of the alternating current.

Figure 3:
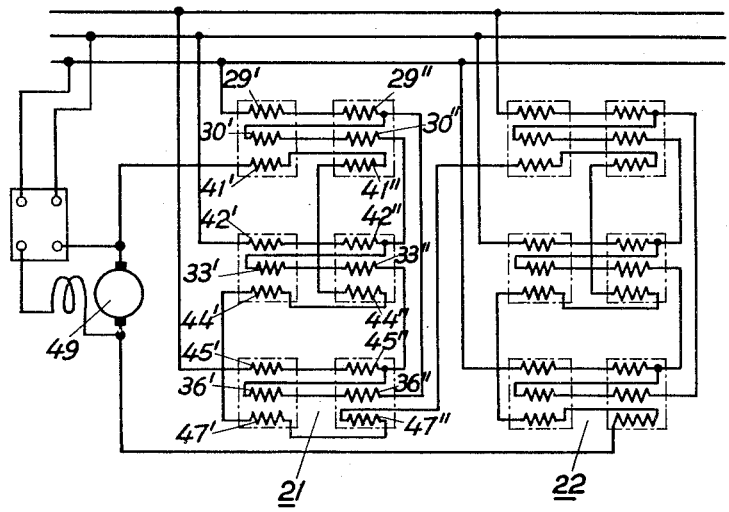

Fig. 3 shows an example of reactors with separate direct current windings. There are two independent reactors 21 and 22, each being composed of three single-phase reactors connected in extended delta. Thus, for instance the windings 30' and 30", which belong to the same single-phase reactor but are, in the usual manner, wound on separate cores for compensating the influence of that fundamental frequency of the alternating current, are connected in delta with the windings 33', 33" and 36', 36", and the windings 29', 29" and 42', 42" and 45', 45" form extensions of the said delta connections. The windings of the three-phase reactor 22 are connected in a corresponding manner, only with the extensions of the delta connection pointing in the opposite direction. The windings are so dimensioned with respect to each other, that the phase voltages of the reactor 21 will be displaced by 15° in one direction with respect to those of the line and the phase voltages of the reactor 22 by the same angle in the opposite direction. The direct current windings 41', 41", 44', 44", 47', 47" on one reactor and the corresponding windings on the other reactor are all connected in series to the current source 49, shown as a direct current generator. The result will be, that the lowest frequency of the pulsations in the direct current will be twelve times the frequency of the alternating current.

Figure 4:
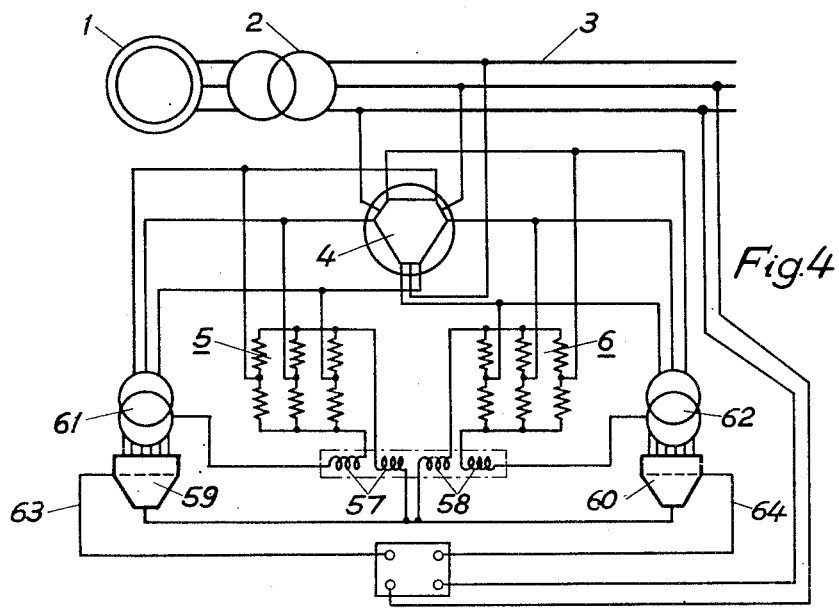

In Fig. 4, the arrangement of the reactors and their connection to the line are identical to those of Fig. 1, and the different parts are designated in a corresponding manner. The direct current is, however, furnished by two grid controlled rectifiers 59, 60 across an interphase transformer 57, 58. The rectifiers are shown as fed across transformers 61, 62 from the same taps of the transformer winding 4 as the corresponding reactors but their transformers may as well be fed directly from the line or in any other appropriate manner. The rectifiers are individually controlled by grid circuits 63, 64 in order to facilitate the adjustment of the currents in both reactors to the same mean value.

The four windings of the interphase transformer 57, 58 are wound on a common iron core in such manner, that the two windings 57 belonging to the same individual reactor 5 magnetize in the same direction, and the two windings 58 belonging to the reactor 6 also mutually in the same direction but opposite to that of the windings 57. The two windings magnetizing in the same direction are used for the purpose of symmetry, and one of these windings could be omitted. The windings counteracting each other serve to absorb the pulsations of six times the alternating current frequency so that only pulsations of twelve times the said frequency and of still higher frequencies will remain. The cathodes of the two rectifiers are connected together, whereby the connection of a spare valve vessel in circuit will be facilitated. A direct current source of the type now described may be also in connection with Fig. 2 or 3 instead of the generator therein illustrated.

Figure 5:
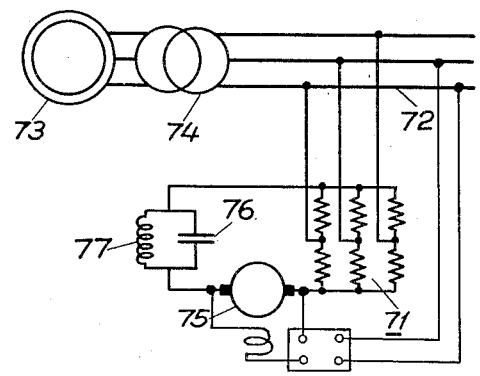

Fig. 5, finally, shows a simple spare-connected six-pulse reactor 71 of the type described in the U. S. patent specification No. 2,372,112, connected to a threephase line 72, fed from a generator 73 through a transformer 74. The direct current circuit of the reactor, which is shown as fed from a generator 75, contains a parallel resonance combination, consisting of a capacitor 76 and a reactor 77, which are tuned together to a frequency of six times that of the alternating current and thus suppress currents of this frequency which is the lowest one otherwise appearing in the direct current circuit.

For the regulation of the magnetizing direct current of the reactors herein shown and described, any type of regulator may be employed. As the purpose of the regulation is to keep the voltage on the line substantially constant, the said regulator should preferably be voltage responsive. For example, in the arrangement shown in Figs. 1, 2, 3 and 5, the direct current generators (9, 10, 49 or 75) may be controlled through an arrangement of the type shown in Patent No. 1,657,056 or Reissue No. 23,148. The control of the grids of rectifiers 59, 60 in Fig. 4 could be accomplished by an arrangement of the type shown in Patent No. 2,063,106. Any deviation from the normal voltage should thus, in a manner well-known per se, influence the magnetizing direct current of the reactor so as to restore voltage equilibrium.

In Figs. 1–4, low frequency pulsations in the direct current are suppressed by causing the same current or equal currents to magnetize separate reactors of different phase. In Fig. 5 such pulsations of the lowest frequency otherwise appearing are suppressed by a resonance circuit. The result will be the same, namely, that the lowest frequency appearing in the direct current circuit will be higher than the lowest one induced in any independent saturable reactor. Hereby not only the losses in the direct current circuit are reduced but also the reaction of the pulsations therein on the alternating current is kept at a reasonable value.

I claim as my invention:

1. Means for compensating capacitative power of an alternating current line comprising a direct current saturable reactor connected in parallel to said line, a direct current circuit connected to said reactor to saturate the same, means responsive to the voltage of the alternating current line to furnish current to said direct current circuit, said direct current circuit having a total reactance which is less than one third of that corresponding to the alternating current reactive power absorbed by said reactor at full load divided by the square of the corresponding saturating direct current, said direct current circuit having means therein to keep the lowest frequency of the substantial pulsations induced in said direct current circuit higher than that of the pulsations induced by any independent reactor forming part of said saturable reactor.

2. A device as claimed in claim 1 in which said saturable reactor is composed of a plurality of parallel independent polyphase reactors of different phase with respect to the alternating current line, and said direct current circuit is constructed and arranged to saturate said independent reactors with direct currents of equal instantaneous value.

3. A device as claimed in claim 1 in which said last means includes a parallel resonance circuit in the direct current circuit tuned to suppress the pulsations of the lowest frequency induced in said direct current circuit from said saturable reactor.

4. A device as claimed in claim 1 in which said direct current circuit is substantially free from inductance except that inherent in the reactor and the current furnishing means.

5. A device as claimed in claim 1 in which said last means includes oppositely acting interphase transformers in the direct current circuit.

HARRY FORSSELL.

References Cited in the file of this patent

UNITED STATES PATENTS

| Number | Name | Date |
|---|---|---|
| 1,696,591 | Blume | Dec. 25, 1928 |
| 1,918,173 | Bedford | July 11, 1933 |
| 2,313,526 | Edwards | Mar. 9, 1943 |
| 2,421,786 | Haug | June 10, 1947 |